US012147809B2

(12) United States Patent
Levit-Gurevich et al.

(10) Patent No.: US 12,147,809 B2
(45) Date of Patent: *Nov. 19, 2024

(54) METHODS AND APPARATUS TO INSERT PROFILING INSTRUCTIONS INTO A GRAPHICS PROCESSING UNIT KERNEL

(71) Applicant: Intel Corporation, Santa Clara, CA (US)

(72) Inventors: Konstantin Levit-Gurevich, Kiryat Byalik (IL); Orr Goldman, Harel (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,142

(22) Filed: Sep. 7, 2023

(65) Prior Publication Data

US 2023/0418613 A1 Dec. 28, 2023

Related U.S. Application Data

(63) Continuation of application No. 17/359,114, filed on Jun. 25, 2021, now Pat. No. 11,775,304, which is a
(Continued)

(51) Int. Cl.
*G06F 11/34* (2006.01)
*G06F 9/32* (2018.01)
(Continued)

(52) U.S. Cl.
CPC ............. *G06F 9/322* (2013.01); *G06F 11/34* (2013.01); *G06F 11/3466* (2013.01); *G06F 11/3636* (2013.01); *G06T 1/20* (2013.01)

(58) Field of Classification Search
None
See application file for complete search history.

(56) References Cited

U.S. PATENT DOCUMENTS 10,025,922 B2 7/2018 Ionescu
10,705,846 B2 7/2020 Levit-Gurevich et al.
(Continued)

OTHER PUBLICATIONS

United States Patent and Trademark Office, "Non-Final Office Action," issued in connection with U.S. Appl. No. 15/998,681, dated Nov. 8, 2019, 18 pages.
(Continued)

*Primary Examiner* — Joni Hsu
(74) *Attorney, Agent, or Firm* — HANLEY, FLIGHT & ZIMMERMAN, LLC

(57) ABSTRACT

Embodiments are disclosed for inserting profiling instructions into graphics processing unit (GPU) kernels. An example apparatus includes instructions, and at least one processor to execute the instructions to determine whether a GPU supports modification of entry point addresses, detect a first entry point address and a second entry point address of an original GPU kernel, create a corresponding instrumented GPU kernel from the original GPU kernel based on the determination by inserting at least one of first profiling initialization instructions or first jump instructions at the first entry point address of the instrumented GPU kernel, inserting at least one of second profiling initialization instructions or second jump instructions at the second entry point address of the instrumented GPU kernel, and inserting profiling measurement instructions into the instrumented GPU kernel.

20 Claims, 8 Drawing Sheets

Related U.S. Application Data continuation of application No. 16/898,189, filed on Jun. 10, 2020, now Pat. No. 11,048,514, which is a continuation of application No. 15/998,681, filed on Aug. 15, 2018, now Pat. No. 10,705,846.

(51) Int. Cl.
*G06F 11/36* (2006.01)
*G06T 1/20* (2006.01)

(56) References Cited

U.S. PATENT DOCUMENTS

| | | |
|---|---|---|
| 11,048,514 B2 | 6/2021 | Levit-Gurevich et al. |
| 2001/0027383 A1 | 10/2001 | Maliszewski |
| 2008/0082970 A1 | 4/2008 | Lueh |
| 2011/0161619 A1 | 6/2011 | Kaminski |
| 2013/0160016 A1 | 6/2013 | Gummaraju |
| 2014/0143513 A1 | 5/2014 | Reid |
| 2017/0090933 A1 | 3/2017 | Day |
| 2017/0329618 A1 | 11/2017 | Tsirkin |

OTHER PUBLICATIONS

United States Patent and Trademark Office, "Notice of Allowance," issued in U.S. Appl. No. 15/998,681 on Mar. 3, 2020 (5 pages).

United States Patent and Trademark Office, "Non-Final Action" issued in U.S. Appl. No. 16/898,189 on Jul. 1, 2020 (19 pages).

United States Patent and Trademark Office, "Final Action" issued in U.S. Appl. No. 16/898,189 on Nov. 17, 2020 (11 pages).

United States Patent and Trademark Office, "Notice of Allowance" issued in U.S. Appl. No. 16/898,189 on Feb. 24, 2021 (5 pages).

United States Patent and Trademark Office, "Non-Final Office Action" issued in U.S. Appl. No. 17/359,114, mailed on Aug. 10, 2022, (19 pages).

United States Patent and Trademark Office, "Final Office Action" issued in U.S. Appl. No. 17/359,114, mailed on Feb. 14, 2023, (19 pages).

United States Patent and Trademark Office, "Notice of Allowance and Fee(s) Due" issued in U.S. Appl. No. 17/359,114, mailed on Jun. 5, 2023, (15pages).

METHODS AND APPARATUS TO INSERT PROFILING INSTRUCTIONS INTO A GRAPHICS PROCESSING UNIT KERNEL

RELATED APPLICATIONS

This patent arises from a continuation of U.S. patent application Ser. No. 17/359,114, now U.S. Pat. No. 11,775,304, filed on Jun. 25, 2021, and entitled "METHODS AND APPARATUS TO INSERT PROFILING INSTRUCTIONS INTO A GRAPHICS PROCESSING UNIT KERNEL", which is a continuation of U.S. patent application Ser. No. 16/898,189, now U.S. Pat. No. 11,048,514, filed on Jun. 10, 2020, and entitled "METHODS AND APPARATUS TO INSERT PROFILING INSTRUCTIONS INTO A GRAPHICS PROCESSING UNIT KERNEL," which is a continuation of U.S. patent application Ser. No. 15/998,681, now U.S. Pat. No. 10,705,846, filed on Aug. 15, 2018, and entitled "METHODS AND APPARATUS TO INSERT PROFILING INSTRUCTIONS INTO A GRAPHICS PROCESSING UNIT KERNEL." Priority to U.S. patent application Ser. No. 17/359,114, U.S. patent application Ser. No. 16/898,189, and U.S. patent application Ser. No. 15/998,681 is hereby claimed. U.S. patent application Ser. No. 17/359,114, U.S. patent application Ser. No. 16/898,189, and U.S. application Ser. No. 15/998,681 are hereby incorporated herein by reference in their entireties.

FIELD OF THE DISCLOSURE

This disclosure relates generally to profiling instructions, and, more particularly, to methods and apparatus to insert profiling instructions into a graphics processing unit (GPU) kernel.

BACKGROUND

Software developers seek to develop code that may be executed as efficiently as possible. To better understand code execution, profiling is used to measure different code execution statistics such as, for example, execution time, memory consumption, etc. In some examples, profiling is implemented by insertion of profiling instructions into the code. Such profiling instructions can be used to store information about the code execution.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

A graphics processing unit (GPU) is an electronic circuit that executes instructions to modify contents of a buffer. Typically, the buffer is a frame buffer that is used to output information to a display device (e.g., a monitor). Recently, GPUs have been used for tasks that are not necessarily related to generating output images.

GPUs execute instruction packages commonly referred to as kernels, compute kernels, and/or shaders. Typically, the term shader is used when a kernel is used for graphics-related tasks such as, for example, DirectX, Open Graphics Library (OpenGL) tasks, pixel shader/shading tasks, vertex shader/shading tasks, etc. The term kernel is used for general purpose computational tasks such as, for example, Open Computing Language (OpenCL) tasks, C for Media tasks, etc. While example approaches disclosed herein use the term kernel, such approaches are equally well suited to be used on shaders. Such kernels roughly correspond to an inner loop of a program that is iterated multiple times. As used herein, a GPU kernel refers to a kernel in binary format. A GPU programmer develops kernels/shaders in a high-level programming language such as, for example, a High-Level Shader Language (HLSL), OpenCL, etc., and then compiles the code into a binary version of the kernel which is then executed by a GPU. Example approaches disclosed herein are applied to the binary version of the kernel.

Developers want to create the most computationally efficient kernels to perform their desired task. To gain a better understanding of the performance of a kernel, developers use a profiler and/or profiling system to collect operational statistics (e.g., performance statistics) of the kernel. Profilers insert additional instructions into the kernel to collect such operational statistics. Usually, such GPU kernels have one entry point (in offset 0x0 from the beginning of binary). In such a single entry-point example, it is trivial to insert such profiling instructions without unintentionally harming operation of the kernel.

Figure 1:
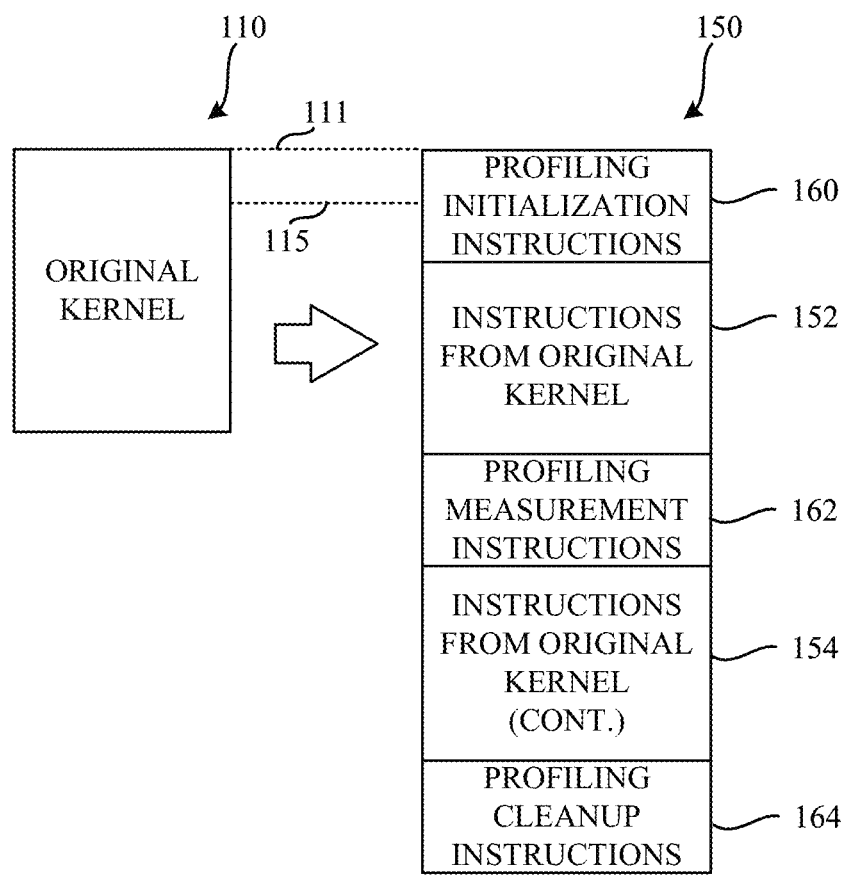
FIG. 1 is a block diagram illustrating example blocks of instrumented instructions.

However, in some examples, there may be several kernel entry points, from which the GPU chooses at runtime. For example, a GPU may choose between a first entry point and a second entry point based on a format of input data to be processed (e.g., based on a variable). For example, FIG. 1 is a block diagram illustrating example blocks of instrumented instructions. In the illustrated example of FIG. 1, an original kernel 110 includes a first entry point 111 and a second entry point 115. In the illustrated example of FIG. 1, the first entry point 111 has an address of 0x0, and the second entry point 115 has an address of 0xc0. However, any number of entry points having any address(es) may additionally or alternatively be used.

When the original kernel 110 is instrumented, an instrumented kernel 150 is created. The instrumented kernel 150 is broken into sections 152 and 154 and includes profiling instructions. Such profiling instructions may be in the form of profiling initialization instructions 160, profiling measurement instructions 162, and/or profiling cleanup instructions 164. Such profiling instructions create and/or store operational information such as, for example, counters, timestamps, etc. that can be used to better understand the execution of the kernel. The profiling initialization instructions 160 are inserted at the beginning of the kernel to initialize variables used for profiling. The profiling measurement instructions 162 are inserted at locations intermediate the original instructions (e.g., intermediate the instructions from the original kernel 152, 154) and, when executed, cause a GPU to collect and/or store the metrics in memory that is accessible by a profiler. The profiling cleanup instructions 164 are inserted at the end of the kernel to perform cleanup (e.g., freeing memory locations, etc.) However, such profiling instructions may additionally or alternatively be inserted at any location and in any order.

In the context of the illustrated example of FIG. 1, if the GPU were to select the second entry point, the instructions at address 0xc0 might begin execution at an unintended location within the instrumented kernel, potentially causing errors in execution of the kernel. In examples disclosed herein, GPU kernels are modified in a manner that does not unintentionally break the intended operations of the kernel.

Figure 2:
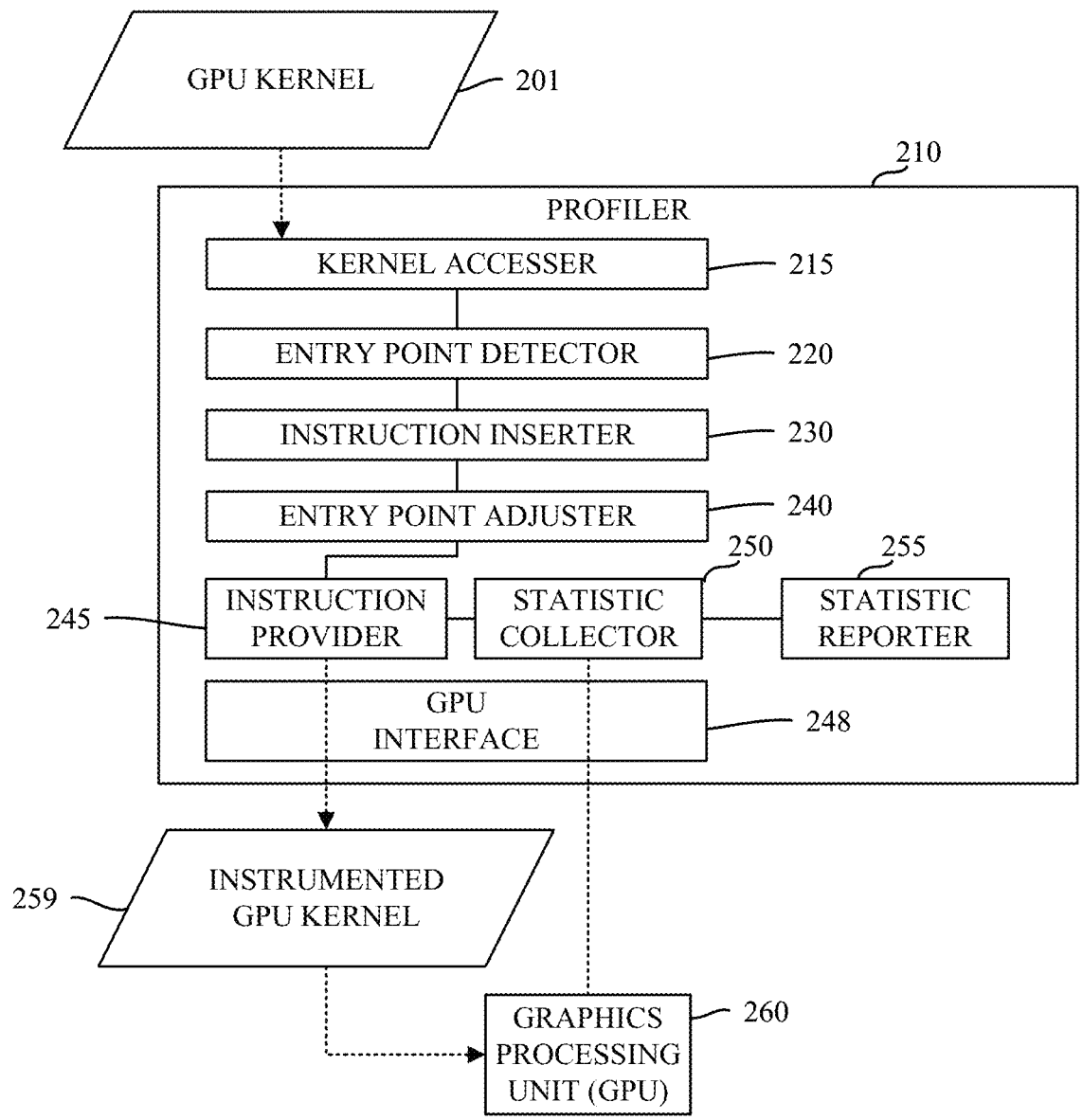
FIG. 2 is a block diagram of an example profiler instrumented in accordance with teachings of this disclosure to insert profiling instructions into a GPU kernel.

FIG. 2 is a block diagram of an example profiler 210 configured in accordance with teachings of this disclosure to insert profiling instructions into a GPU kernel. The example profiler 210 receives a GPU kernel 201 (e.g., in a binary format) and modifies the GPU kernel to create an instrumented GPU kernel 259. That is, the example profiler 210 creates the instrumented GPU kernel 259 without executing any compilation of the GPU kernel. In this manner, already-compiled GPU kernels can be instrumented and/or profiled. The instrumented GPU kernel 259 is passed to a graphics processing unit (GPU) 260. In the illustrated example of FIG. 2, the profiler 210 includes a kernel accesser 215, an entry point detector 220, an instruction inserter 230, an entry point adjuster 240, an instruction provider 245, a GPU interface 248, a statistic collector 250, and a statistic reporter 255.

In the illustrated example of FIG. 2, the example profiler 210 is implemented using a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example profiler 210 receives the GPU kernel 201 for instrumentation. In examples disclosed herein, but GPU kernel 201 may be provided by a software developer. In some examples, instead of providing the GPU kernel 201 directly, a reference to (e.g., a pointer, a filename, a uniform resource locator (URL), etc.) the GPU kernel 201 is provided, such that the example profiler 210 retrieves the GPU kernel 201 for instrumentation.

The example kernel accesser 215 of the illustrated example of FIG. 2 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example kernel accesser 215 accesses an incoming GPU kernel (e.g., the GPU kernel 201 of FIG. 2). In some examples, the GPU kernel 201 is accessed from a memory by the kernel accesser 215.

The example kernel accesser 215 determines a size of the original kernel to be instrumented. In examples disclosed herein, the size is determined by the number of instruction addresses used by the original kernel. However, in some examples, the example kernel accesser 215 may determine the size based on the entry point addresses identified by the entry point detector 220. For example, the size of the original kernel may be identified as the number of instruction addresses between the first instruction in the kernel through the final entry point of the kernel.

The example entry point detector 220 of the illustrated example of FIG. 2 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example entry point detector 220 detects entry point(s) in the GPU kernel 201. In some examples, the entry point(s) are detected by inspecting a list of entry points associated with the GPU kernel 201.

In some examples, the entry point detector 220, to detect the entry points, causes the instruction provider 245 to provide a copy of the original GPU kernel 201 to the GPU 260 via the GPU interface 248, and then requests the list of entry point addresses from the GPU 260. GPUs that support entry point modification will typically respond to such a request, whereas GPUs that do not support entry point modification will not respond to such a request.

The example instruction inserter 230 of the illustrated example of FIG. 2 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc.

In examples in which the GPU 260 supports modification of entry point addresses, the example instruction inserter 230 inserts profiling initialization instructions into the original kernel instructions to create an instrumented kernel. In such an example, the entry point adjuster 240 modifies the addresses of the entry points to accommodate the inserted profiling initialization instructions.

In examples in which the GPU 260 does not support modification of entry point addresses, the example instruction inserter 230 modifies the instruction at the original entry point address to jump to an address of first profiling initialization instructions. The example instruction inserter 230 fills the address space between the original entry point address with no-execution instruction(s). In examples disclosed herein, the no-execution instruction(s) are implemented as NOP instructions. However, any other no-execution instruction(s) may additionally or alternatively be used. That is, if there is enough space between entry point addresses, useful instructions can be placed inline instead of the NOPs, and then a jump instruction can be used to jump to corresponding code before the next entry point address.

The example instruction inserter 230 inserts profiling initialization instructions into the instrumented kernel. In examples disclosed herein, the profiling initialization instructions are added at the address $B_i$. However, any other arrangement and/or ordering of instructions may additionally or alternatively be used. In some examples, the instruction inserter 230 inserts a jump instruction to a modified entry point EP', after the profiling initialization instructions.

The example entry point adjuster 240 of the illustrated example of FIG. 2 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In examples where the GPU 260 supports modification of entry point addresses, the example entry point adjuster 240 modifies the location of the entry point addresses to point to newly inserted profiling initialization instruction(s) (e.g., instructions inserted by the example instruction inserter 230), instead of the original entry point address(es).

The example instruction provider 245 of the illustrated example of FIG. 2 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example instruction provider 245 provides the instrumented kernel to the GPU 260 for execution via the example GPU interface 248. In some examples, the instruction provider 245 instructs the GPU 260 to execute the instrumented kernel.

The example GPU interface 248 of the illustrated example of FIG. 2 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example GPU interface 248 enables communication between the profiler 210 and the example GPU 260. In examples disclosed herein, the example GPU interface 248 implements a driver that enables the communications with the GPU 260. However, any other approach to facilitating communication with a GPU may additionally or alternatively be used.

The example statistic collector 250 of the illustrated example of FIG. 2 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example statistic collector 250 collects results of the execution of the instrumented kernel by interfacing with the GPU 260 via the GPU interface 248.

The example statistic reporter 255 of the illustrated example of FIG. 2 is implemented using a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example statistic reporter 255 prepares a report of the statistics of the execution of the instrumented GPU kernel (e.g., based on the statistics collected by the example statistic collector 250).

The example GPU 260 of the illustrated example of FIG. 2 is implemented using a circuit. The GPU 260 executes instructions to modify the contents of a buffer (e.g., a buffer stored in a memory internal to the GPU 260 and/or a memory external to the GPU 260). Typically, the buffer is a frame buffer that is used to output information to a display device (e.g., a monitor). Recently, GPUs have been used for tasks that are not necessarily related to generating output images such as, for example, computationally intensive tasks. In examples disclosed herein, the GPU 260 executes an instruction package commonly referred to as a kernel and/or a compute kernel. In the illustrated example of FIG. 2 a single GPU is shown. However, some computing systems may utilize multiple GPUs.

While an example manner of implementing the example profiler 210 is illustrated in FIG. 2, one or more of the elements, processes and/or devices illustrated in FIG. 2 may be combined, divided, re-arranged, omitted, eliminated and/or implemented in any other way. Further, the example kernel accesser 215, the example entry point detector 220, the example instruction inserter 230, the example entry point adjuster 240, the example instruction provider 245, the example GPU interface 248, the example statistic collector 250, the example statistic reporter 255, and/or, more generally, the example profiler 210 of the illustrated example of FIG. 2 may be implemented by hardware, software, firmware and/or any combination of hardware, software and/or firmware. Thus, for example, any of the example kernel accesser 215, the example entry point detector 220, the example instruction inserter 230, the example entry point adjuster 240, the example instruction provider 245, the example GPU interface 248, the example statistic collector 250, the example statistic reporter 255, and/or, more generally, the example profiler 210 of the illustrated example of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example kernel accesser 215, the example entry point detector 220, the example instruction inserter 230, the example entry point adjuster 240, the example instruction provider 245, the example GPU interface 248, the example statistic collector 250, the example statistic reporter 255, and/or, more generally, the example profiler 210 of the illustrated example of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example profiler 210 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
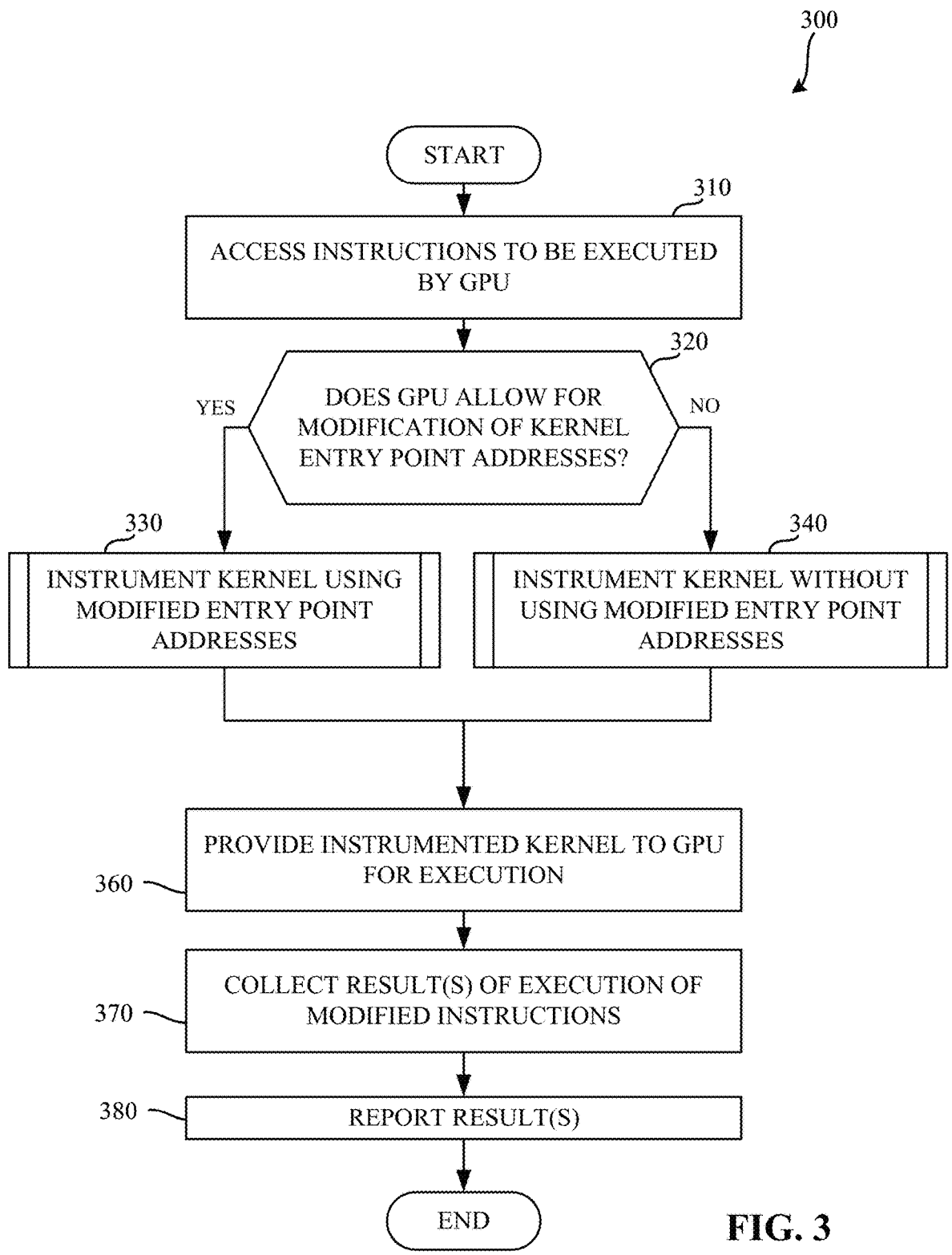
FIG. 3 is a flowchart representative of machine readable instructions that, when executed, cause the profiler to insert profiling instructions into a GPU kernel.
Figure 4:
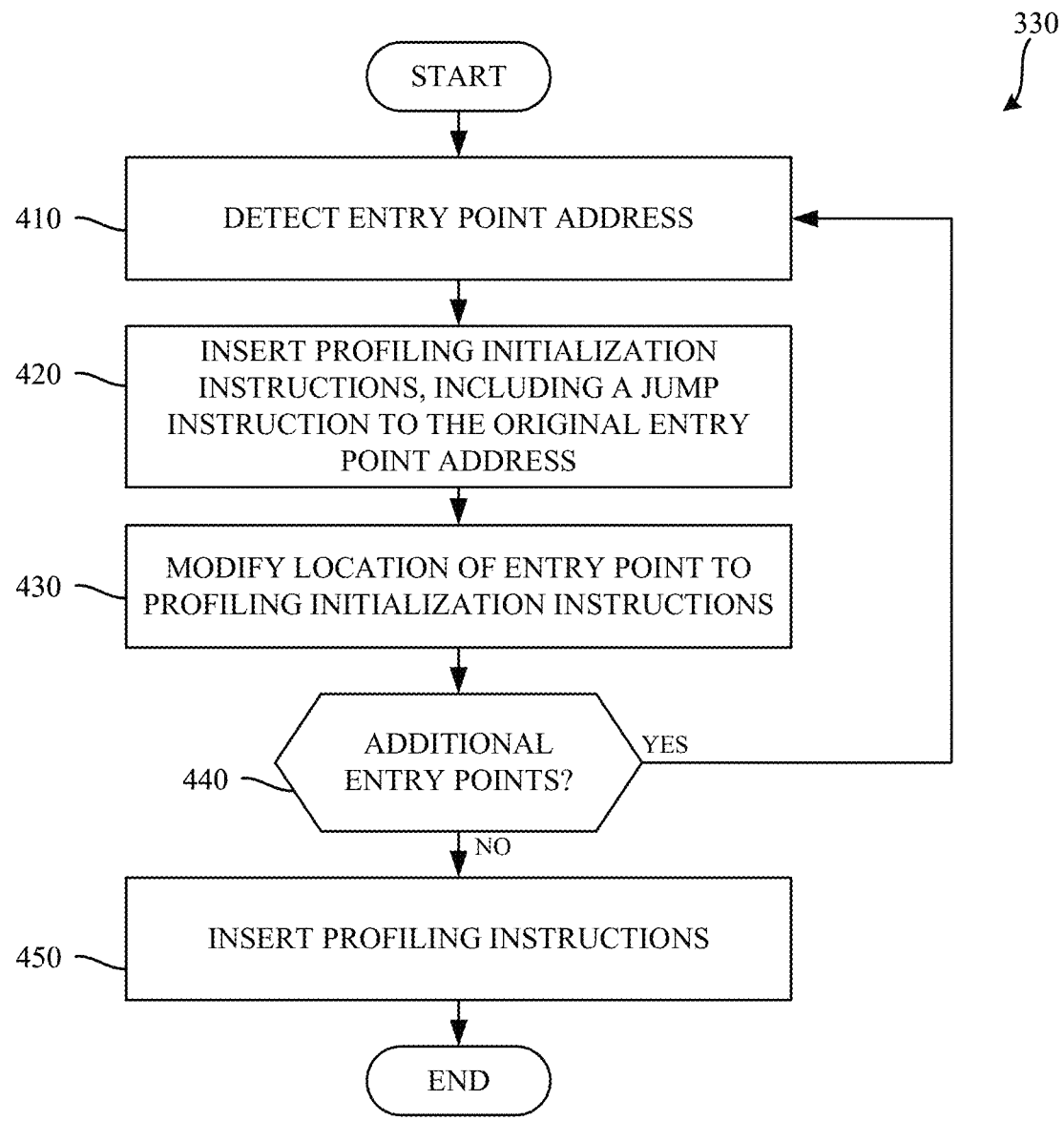
FIG. 4 is a flowchart representative of machine readable instructions that, when executed, cause the profiler to instrument a GPU kernel using modified entry point addresses.

Flowcharts representative of example hardware logic, machine readable instructions, hardware implemented state machines, and/or any combination thereof for implementing the example profiler 210 of FIG. 2 are shown in FIGS. 3, 4, and/or 6. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 3, 4, and/or 6, many other methods of implementing the example profiler 210 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3, 4, and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open-ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open-ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 3 is a flowchart representative of machine readable instructions that, when executed, cause the profiler to insert profiling instructions into a GPU kernel. The example process 300 of the illustrated example of FIG. 3 begins when the example kernel accessor 215 accesses instructions to be executed by the GPU 260. Block 310. In examples disclosed herein, a kernel includes instructions (each having an instruction address), and a list of instruction addresses where the GPU may begin execution of the kernel. In some examples, the GPU allows modification of the list of instruction addresses (e.g., the entry points), whereas in some other examples such modification is not allowed and/or supported.

The example GPU interface 248 determines whether the GPU 260 (and/or a driver facilitating communication with the GPU 260) support modification of kernel entry point addresses. (Block 320). In examples disclosed herein, whether or not the GPU 260 allows for modification of kernel entry point addresses is representative of whether the GPU and/or the driver for interfacing with the GPU is aware that a kernel is being instrumented with profiling instructions. In some examples, the determination of whether the GPU supports modification of kernel entry point addresses is made by attempting to modify entry point addresses of a dummy kernel. The dummy kernel is not intended to actually result in execution of kernel instructions by the GPU, but is instead intended to enable a determination of whether the GPU supports modification of kernel entry point addresses.

If the GPU interface 248 determines that the GPU 260 allows for modification of kernel entry point addresses (e.g., block 320 returns a result of YES), the example profiler instruments the kernel using modified entry point addresses. (Block 330). An example approach to instrumenting the kernel using modified entry point addresses is described below in connection with FIG. 4.

Alternatively, if the example GPU interface 248 determines that the GPU 260 does not allow for modification of kernel entry point addresses (e.g., block 320 returns result of NO), the example profiler 210 instruments the kernel without using modified entry point addresses. (Block 340). An example approach to instrumenting the kernel without using modified entry point addresses is described below in connection with FIG. 6.

The instrumented kernel (e.g., the instrumented GPU kernel 259 of FIG. 2) is provided to the GPU 260 by the example instruction provider 245 (e.g., via the GPU interface 248). (Block 360). The example statistic collector 250 then collects results of the execution of the instrumented kernel by interfacing with the GPU 260 via the GPU interface 248. (Block 370). The example statistic reporter 255 prepares a report of the statistics of the execution of the instrumented GPU kernel. (Block 380). The example process 300 of the illustrated example of FIG. 3 then terminates.

Figure 5:
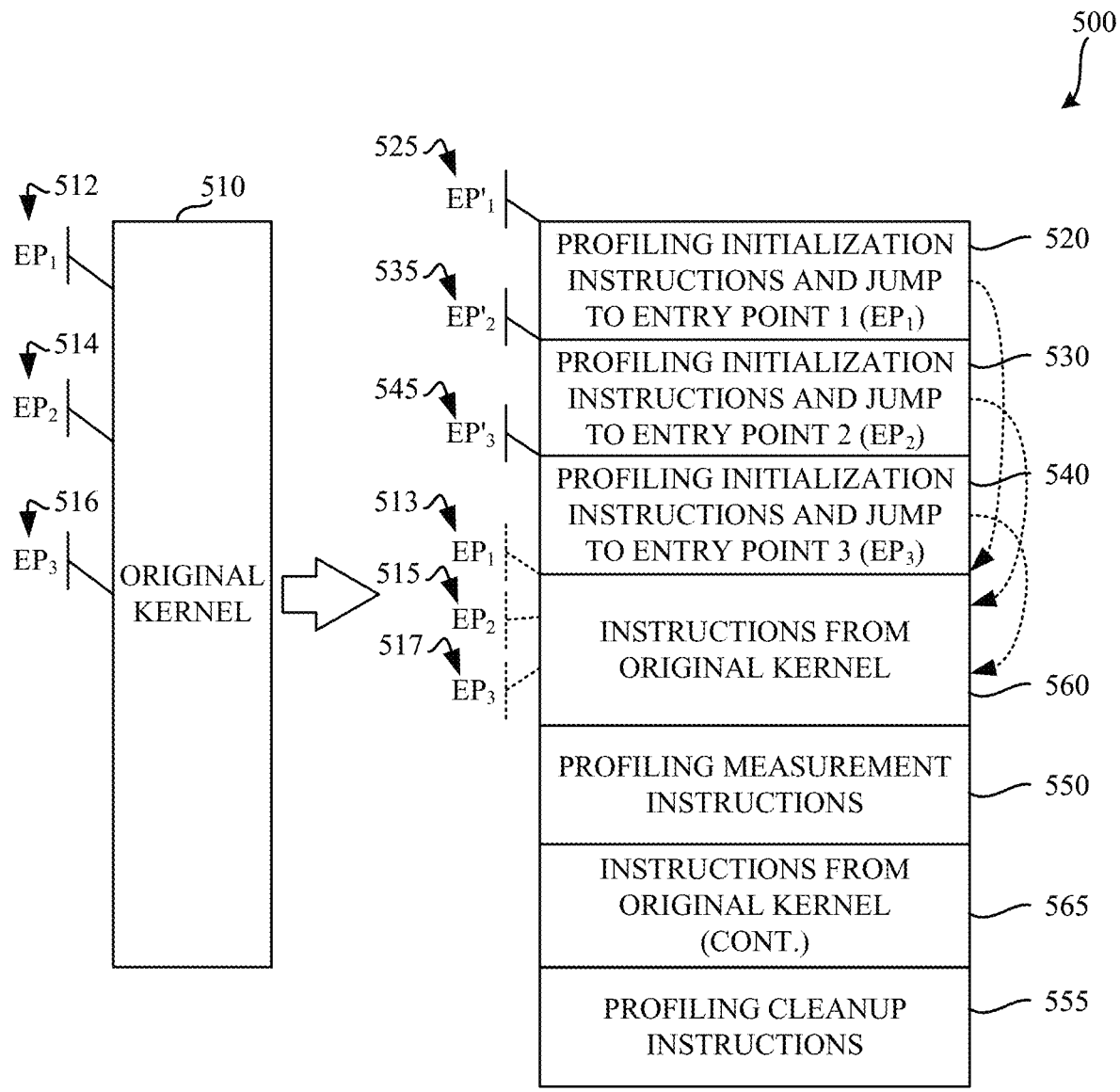
FIG. 5 is an example diagram illustrating an example kernel instrumented using modified entry point addresses.

FIG. 4 is a flowchart representative of machine readable instructions that, when executed, cause the profiler to instrument a GPU kernel using modified entry point addresses, and FIG. 5 is an example diagram illustrating an example kernel instrumented using modified entry point addresses (e.g., the example process 330 of FIG. 4). Referring first to the example diagram of FIG. 5, an original kernel 510 includes entry points EP1 512, EP2 514, and EP3 516. While three entry points are shown in the illustrated example of FIG. 5, any number of entry points having any entry point address(es) may additionally or alternatively be used.

Returning to FIG. 4, the example process 330 of the illustrated example of FIG. 4 begins when the example entry point detector 220 detects an entry point in the GPU kernel (e.g., $EP_1$ 512 of the original kernel 510 of FIG. 5). (Block 410). The example instruction inserter 230 inserts profiling initialization instructions (e.g., instructions 520) into the instrumented kernel instructions, including a jump instruction to the original entry point instructions (e.g., $EP_1$ 512, which may now be at a different instruction address). (Block 420). The example entry point adjuster 240 then modifies the location of the entry point addresses to point to the newly inserted profiling initialization instruction(s), instead of the modified address of the first entry point $EP_1$ 513. (e.g., the entry point adjuster 240 modifies the entry point address to the address of $EP'_1$ 525 of FIG. 5). (Block 430). The example entry point detector 220 then determines whether any additional entry points exist. (Block 440).

If additional entry points exist (e.g., block 440 returns a result of YES), the example process of blocks 410 through 440 is repeated until no additional entry points exist (e.g., until block 440 returns a result of NO). In the illustrated example of FIG. 5, the process is repeated in connection with the second and third entry points ($EP_2$ 514 and $EP_3$ 516). In connection with the second entry point $EP_2$ 514, profiling initialization instructions (e.g., instructions 530) are inserted at a second modified entry point $EP'_2$ 535, and include a jump instruction to the moved location of the second entry point $EP_2$ 515. The example entry point adjuster 240 then modifies the location of the second entry point address to point to the newly inserted profiling initialization instruction(s) (e.g., EP'$_2$ 535), instead of the modified address of the second entry point EP$_2$ 515.

In connection with the third entry point EP$_3$ 516, profiling initialization instructions (e.g., instructions 540) are inserted at a third modified entry point EP'$_3$ 545, and include a jump instruction to the moved location of the third entry point EP$_3$ 517. The example entry point adjuster 240 modifies the location of the third entry point address to point to the newly inserted profiling initialization instruction(s) (e.g., EP'$_3$ 545), instead of the modified address of the third entry point EP$_3$ 517.

Having inserted the profiling initialization instructions and modified the entry point addresses of each of the initial entry points, the example instruction inserter 230 inserts the remaining profiling instructions (e.g., profiling measurement instructions 550 and/or profiling cleanup instructions 555) into the instructions from the original kernel 560, 565. (Block 450). The instrumented kernel is then ready to be provided to the example GPU 260 for execution. The example process 330 of FIG. 4 then terminates, and the instrumented kernel is then provided to the GPU 260 by the instruction provider 245 (see block 360 of FIG. 3).

Figure 6:
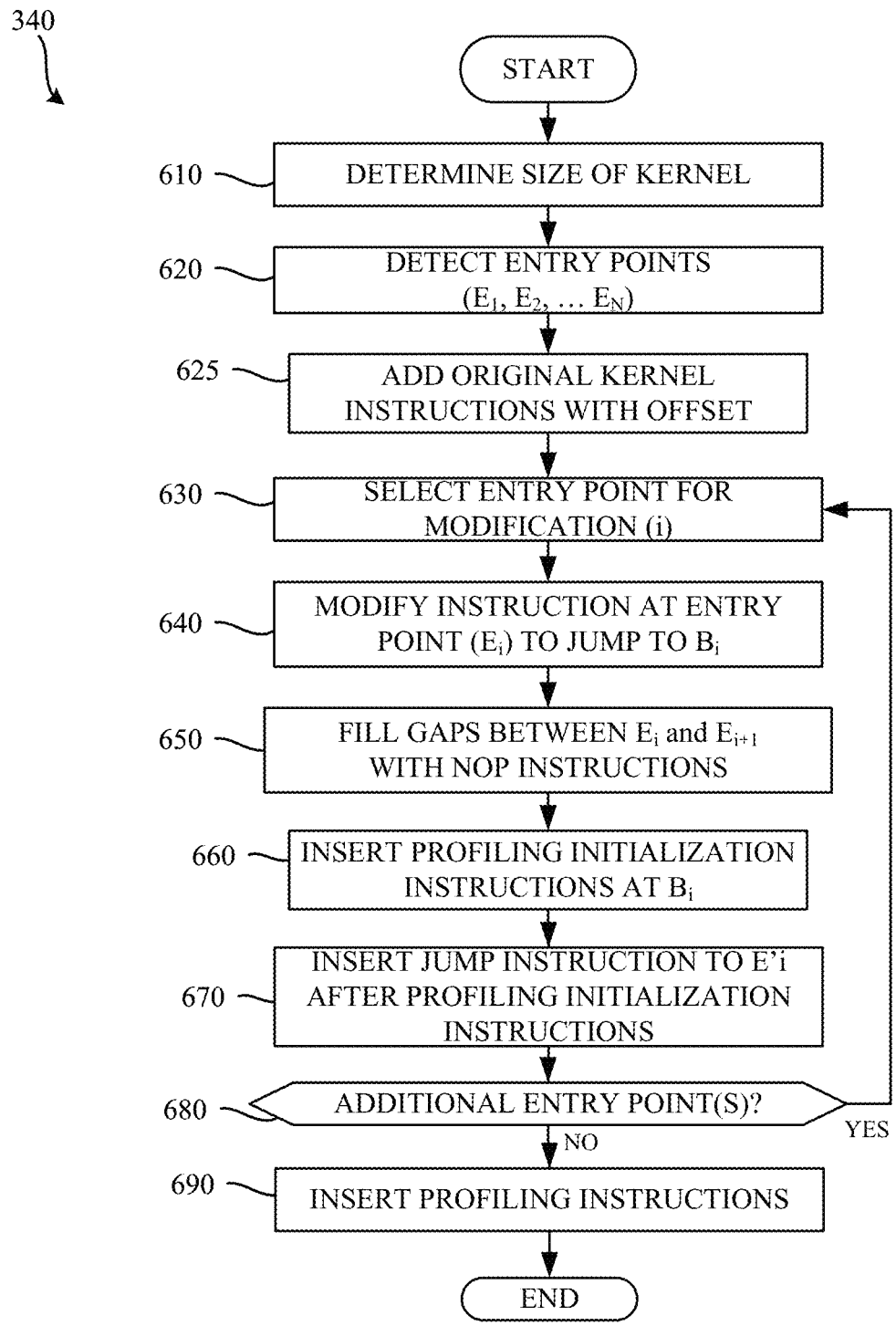
FIG. 6 is a flowchart representative of machine readable instructions that, when executed, cause the profiler to instrument a GPU kernel without using modified entry point addresses.
Figure 7:
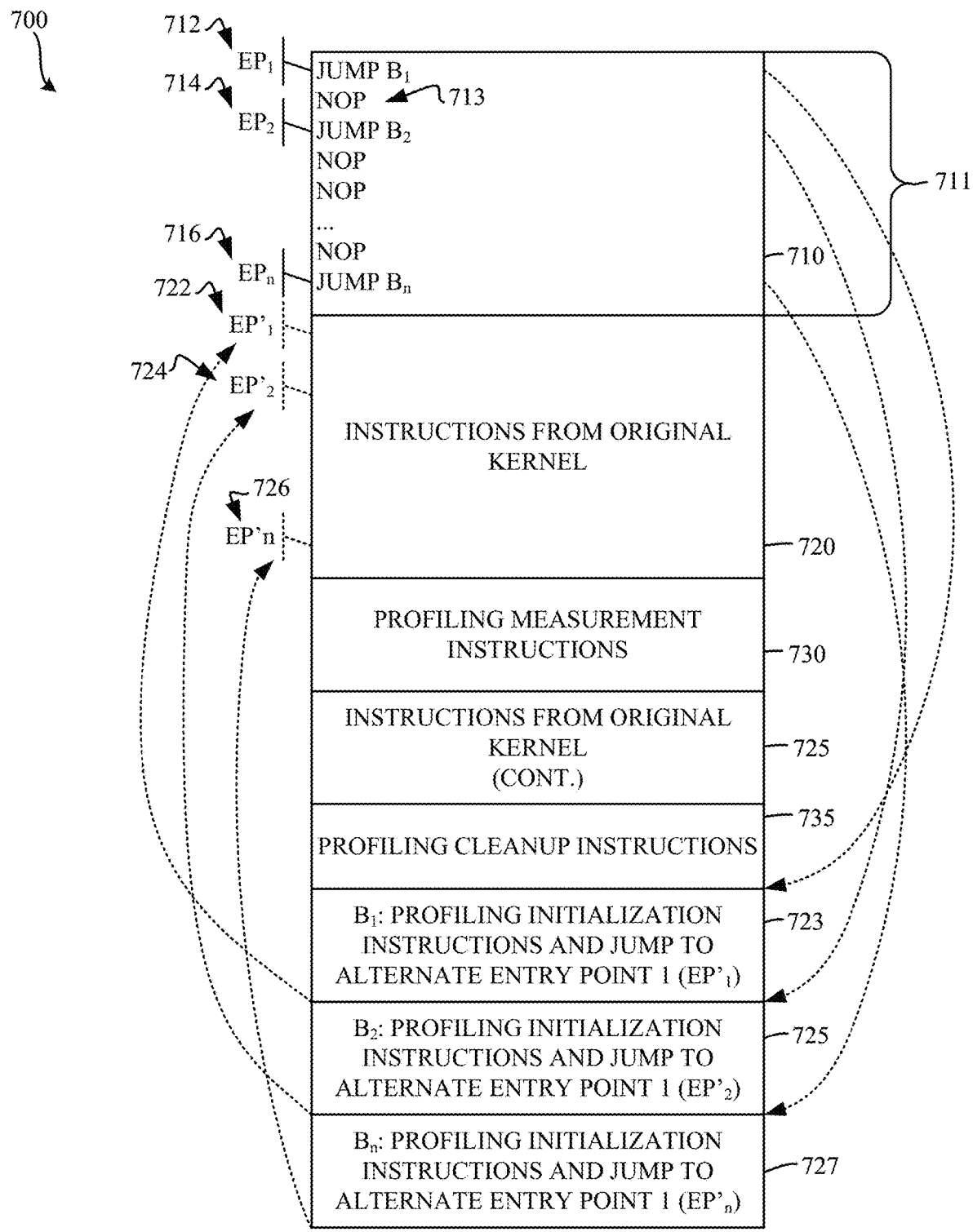
FIG. 7 is an example diagram illustrating an example kernel instrumented without using modified entry point addresses.

FIG. 6 is a flowchart representative of machine readable instructions that, when executed, cause the profiler to instrument a GPU kernel without using modified entry point addresses, and FIG. 7 is an example diagram illustrating an example kernel instrumented without using modified entry point addresses (e.g., the example process 340 of FIG. 6). In contrast to the illustrated example of FIGS. 4 and/or 5, in some examples, the GPU 260 may not support alterations to the list of entry points. In such examples, the kernel is instrumented in a manner where the original entry point addresses are maintained, but the instructions at those entry point addresses are replaced with jump instructions that direct the GPU to execute profiling initialization instructions.

The example process 340 of FIG. 6 begins when the example kernel accesser 215 determines a size of the original kernel to be instrumented. (Block 610). In examples disclosed herein, the size is determined by the number of instruction addresses used by the original kernel. However, in some examples, the size may be determined based on the entry point addresses. For example, the size of the original kernel may be identified as the number of instruction addresses between the first instruction in the kernel through the final entry point of the kernel.

The example entry point detector 220 then detects the entry point addresses in the original kernel. (Block 620). Since, in the illustrated example of FIGS. 6 and/or 7, modification of those entry point addresses is not supported, those entry point addresses are re-used as part of the instrumentation. The example instruction inserter 230 inserts into the instrumented kernel the instructions from the original kernel (e.g., instructions 720 and/or 725 of FIG. 7) using an address offset 711 based on the size of the original kernel. (Block 625). In this manner, the initial address space 710 that was occupied by the kernel instructions is freed for use by jump instructions to locations of profiling initialization instructions and/or the profiling initialization instructions themselves. In other words, the entry point instructions appearing at original entry point addresses EP$_1$ 712, EP$_2$ 714, . . . , and EP$_n$ 716 are shifted to EP'$_1$ 722, EP'$_2$ 724, . . . , and EP'$_n$ 726, respectively.

The example entry point detector selects an original entry point (i) for modification (e.g., EP$_1$ 712, EP$_2$ 714, . . . , or EP$_n$ 716). (Block 630). The example instruction inserter 230 modifies the instruction at the entry point address to jump to an address of first profiling initialization instructions (e.g., block 723 of FIG. 7). (Block 640). The example instruction inserter 230 fills the address space between the original entry point address (e.g., the entry point address EP$_i$) and the next entry point address (e.g., the entry point address EP$_{i+1}$) with no-execution instruction(s) (e.g., instruction 713 of FIG. 7). (Block 650). In examples disclosed herein, the no-execution instruction(s) are implemented as NOP instructions. However, any other no-execution instruction(s) may additionally or alternatively be used. That is, if there is enough space between entry point addresses, useful instructions can be placed inline instead of the NOPs, and then jump to corresponding code before the next entry point address.

The example instruction inserter 230 inserts profiling initialization instructions (e.g., block 723, 725, 727). (Block 660). In examples disclosed herein, the profiling initialization instructions are added at the address B. The example instruction inserter 230 inserts a jump instruction to a modified entry point EP'$_i$ (e.g., EP'$_1$ 722, EP'$_2$ 724, . . . , EP'$_n$ 726) after the profiling initialization instructions. (Block 670). The example entry point detector 220 determines whether there any additional entry points to be modified. (Block 680). If an additional entry point exists (e.g., if block 680 returns a result of YES), the example process of FIG. 6 proceeds to block 630 where the identified entry point is processed. (Blocks 630 through 670). The example process of blocks 630 through 670 is repeated until all entry points have been processed. If no additional entry points exist (e.g., block 680 returns a result of NO), the example instruction inserter 230 inserts profiling instructions (e.g., profiling measurement instructions 730 and/or profiling cleanup instructions 735) into the instrumented kernel 720, 725. (Block 690). The instrumented kernel is then ready to be provided to the example GPU 260 for execution. In this manner, when a GPU 260 begins execution of the kernel at entry point EPi, the GPU 260 will first jump to Bi, execute the profiling initialization instructions, then jump to the modified entry point EP'i to execute the instrumented instructions. The example process 340 of FIG. 6 then terminates, and the instrumented kernel is then provided to the GPU 260 by the instruction provider 245 (see block 360 of FIG. 3).

Figure 8:
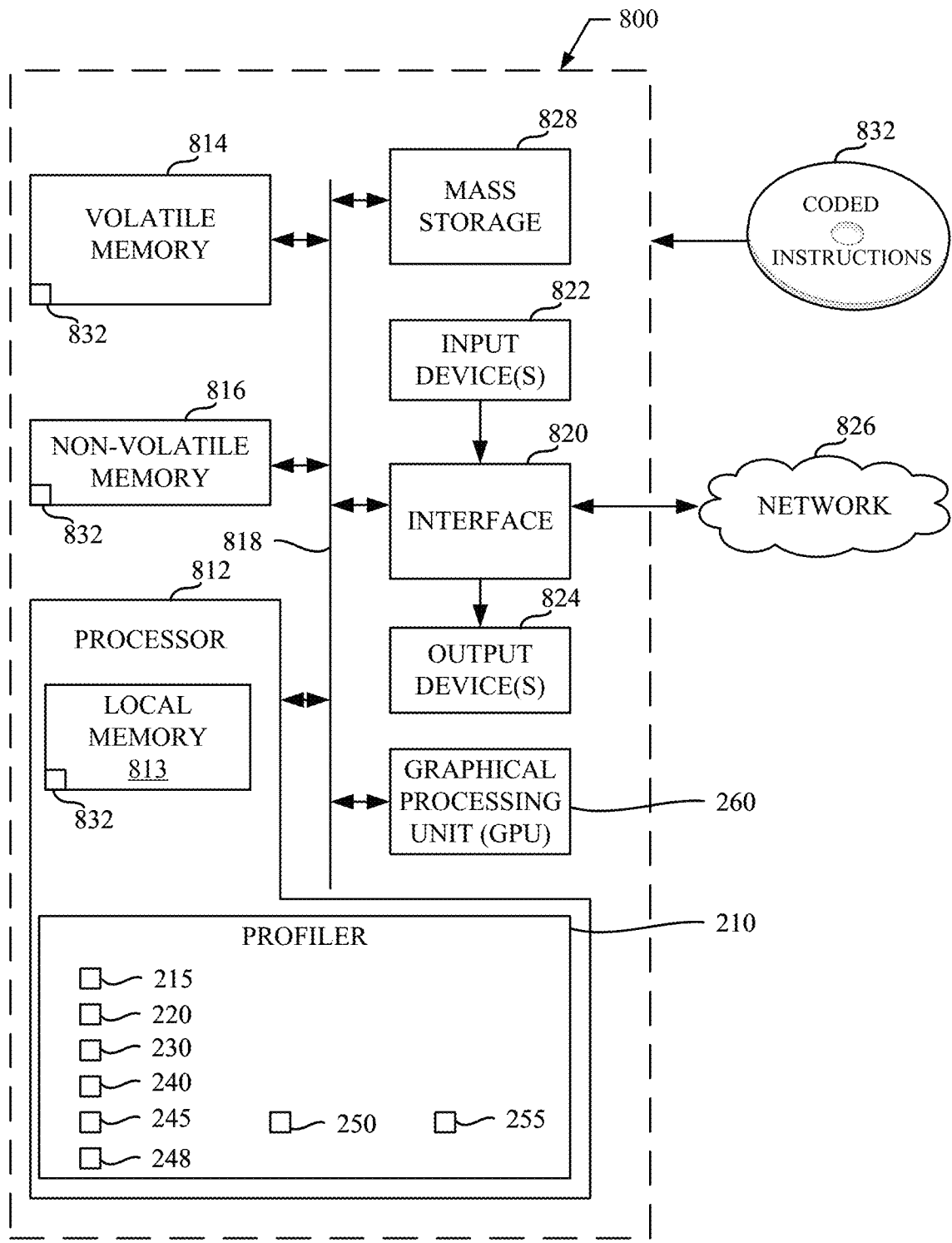
FIG. 8 is a block diagram of an example processing platform structured to execute the instructions of FIGS. 3, 4, and/or 6 to implement the example profiler of FIG. 2.

FIG. 8 is a block diagram of an example processor platform 800 structured to execute the instructions of FIGS. 3, 4, and/or 6 to implement the example profiler of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon-based) device. In this example, the processor implements the example kernel accesser 215, the example entry point detector 220, the example instruction inserter 230, the example entry point adjuster 240, the example instruction provider 245, the example GPU interface 248, the example statistic collector 250, the example statistic reporter 255, and/or, more generally, the example profiler 210 of the illustrated example of FIG. 2.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.), a tactile output device, a printer and/or speaker. The interface circuit 820 of the illustrated example, thus, typically includes a graphics driver card, a graphics driver chip and/or a graphics driver processor. In some examples, the output devices 824 implement a graphics processing unit GPU (e.g., the GPU 260 of FIG. 2).

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3, 4, and/or 6 may be stored in the mass storage device 828, in the volatile memory 814, in the non-volatile memory 816, and/or on a removable non-transitory computer readable storage medium such as a CD or DVD.

In the illustrated example of FIG. 8, the example GPU 260 communicates with other components of the processor platform 800 via the bus 818. In some examples, the GPU is implemented as a video card. In some other examples, the GPU is implemented as a component of the processor 812.

From the foregoing, it will be appreciated that example methods, apparatus and articles of manufacture have been disclosed that enable software developers to profile execution of GPU kernels. The disclosed methods, apparatus and articles of manufacture improve the efficiency of using a computing device by enabling profiling of GPU kernels, thereby allowing more efficient GPU kernels to be developed. The disclosed methods, apparatus and articles of manufacture are accordingly directed to one or more improvement(s) in the functioning of a computer.

Example 1 includes an apparatus to create instrumented graphics processing unit (GPU) kernels, the apparatus comprising an entry point detector to detect a first entry point address and a second entry point address of an original GPU kernel, and an instruction inserter to create a corresponding instrumented GPU kernel from the original GPU kernel by adding instructions of the original GPU kernel and one or more profiling instructions to the instrumented GPU kernel, the instruction inserter to insert, at the first entry point address of the instrumented GPU kernel, a first jump instruction to jump to first profiling initialization instructions, the instruction inserter to insert, at the second entry point address of the instrumented GPU kernel, a second jump instruction to jump to second profiling initialization instructions, and the instruction inserter to insert profiling measurement instructions of the profiling instructions into the instrumented GPU kernel.

Example 2 includes the apparatus of example 1, wherein the first profiling initialization instructions include a third jump instruction to jump to a modified first entry point address, the modified first entry point address is based on the first entry point address and an instruction address offset.

Example 3 includes the apparatus of example 2, wherein the second profiling initialization instructions include a fourth jump instruction to jump to a modified second entry point address, the modified second entry point address is based on the second entry point address and the instruction address offset.

Example 4 includes the apparatus of example 1, further including a kernel accesser to determine a size of the original GPU kernel, wherein instructions of the original GPU kernel are added to the instrumented GPU kernel using an instruction address offset based on the size of the original GPU kernel.

Example 5 includes the apparatus of example 1, wherein the instructions of the original GPU kernel are added to the instrumented GPU kernel using an instruction address offset based on an entry point address of the original GPU kernel.

Example 6 includes the apparatus of any one of examples 1 through 5, further including an instruction provider to provide the instrumented GPU kernel to a GPU for execution.

Example 7 includes the apparatus of example 4, further including a statistic collector to collect operational statistics resulting from the execution of the instrumented GPU kernel by the GPU.

Example 8 includes the apparatus of example 1, wherein the instruction inserter is further to insert profiling cleanup instructions into the instrumented GPU kernel.

Example 9 includes the apparatus of example 1, wherein the entry point detector is to retrieve the first entry point address and the second entry point address of the original GPU kernel from a GPU.

Example 10 includes the apparatus of example 1, wherein the instruction inserter is to insert at least one no-operation instruction in the instrumented GPU kernel between the first entry point address and the second entry point address.

Example 11 includes at least one non-transitory computer-readable storage medium comprising instructions that, when executed, cause at least one processor to at least detect a first entry point address and a second entry point address of an original GPU kernel, add instructions of the original GPU kernel and one or more profiling instructions to an instrumented GPU kernel using an instruction address offset, insert, at the first entry point address of the instrumented GPU kernel, a first jump instruction to jump to first profiling initialization instructions, insert, at the second entry point address of the instrumented GPU kernel, a second jump instruction to jump to second profiling initialization instructions, and insert profiling measurement instructions of the profiling instructions into the instrumented GPU kernel.

Example 12 includes the at least one non-transitory computer-readable storage medium of example 11, the first profiling initialization instructions including a third jump instruction to jump to a modified first entry point address, the modified first entry point address based on the first entry point address and an instruction address offset.

Example 13 includes the at least one non-transitory computer-readable storage medium of example 12, the second profiling initialization instructions including a fourth jump instruction to jump to a modified second entry point address, the modified second entry point address based on the second entry point address and the instruction address offset.

Example 14 includes the at least one non-transitory computer-readable storage medium of example 11, wherein the instructions, when executed, cause the at least one processor to at least determine a size of the original GPU kernel, wherein the instructions of the original GPU kernel are added to the instrumented GPU kernel using an instruction address offset based on the size of the original GPU kernel.

Example 15 includes the at least one non-transitory computer-readable storage medium of example 11, wherein the instructions of the original GPU kernel are added to the instrumented GPU kernel using an instruction address offset based on an entry point address of the original GPU kernel.

Example 16 includes the at least one non-transitory computer-readable storage medium of any one of examples 11 through 15, wherein the instructions, when executed, cause the at least one processor to at least provide the instrumented GPU kernel to a GPU for execution.

Example 17 includes the at least one non-transitory computer-readable storage medium of example 12, wherein the instructions, when executed, cause the at least one processor to at least collect operational statistics resulting from the execution of the instrumented GPU kernel by the GPU.

Example 18 includes the at least one non-transitory computer-readable storage medium of example 11, wherein the instructions, when executed, cause the at least one processor to at least insert profiling cleanup instructions into the instrumented GPU kernel.

Example 19 includes the at least one non-transitory computer-readable storage medium of example 11, wherein the instructions, when executed, cause the at least one processor to at least retrieve the first entry point address and the second entry point address of the original GPU kernel from a GPU.

Example 20 includes the at least one non-transitory computer-readable storage medium of example 11, wherein the instructions, when executed, cause the at least one processor to at least insert at least one no-operation instruction in the instrumented GPU kernel between the first entry point address and the second entry point address.

Example 21 includes an apparatus to insert profiling instructions into graphics processing unit (GPU) kernels, the apparatus comprising means for detecting a first entry point address and a second entry point address of the original GPU kernel, and means for creating a corresponding instrumented GPU kernel from the original GPU kernel by adding instructions of the original GPU kernel into and one or more profiling instructions to the instrumented GPU kernel, the means for creating to insert, at the first entry point address of the instrumented GPU kernel, a first jump instruction to jump to first profiling initialization instructions, the means for creating to insert, at the second entry point address of the instrumented GPU kernel, a second jump instruction to jump to second profiling initialization instructions, the means for creating to insert profiling measurement instructions of the profiling instructions into the instrumented GPU kernel.

Example 22 includes the apparatus of example 21, wherein the first profiling initialization instructions include a third jump instruction to jump to a modified first entry point address, the modified first entry point address is based on the first entry point address and an instruction address offset.

Example 23 includes the apparatus of example 22, wherein the second profiling initialization instructions include a fourth jump instruction to jump to a modified second entry point address, the modified second entry point address is based on the second entry point address and the instruction address offset.

Example 24 includes the apparatus of example 21, further including means for determining a size of the original GPU kernel, wherein the instructions of the original GPU kernel are added to the instrumented GPU kernel using an instruction address offset based on the size of the original GPU kernel.

Example 25 includes the apparatus of example 21, wherein the instructions of the original GPU kernel are added to the instrumented GPU kernel using an instruction address offset based on an entry point address of the original GPU kernel.

Example 26 includes the apparatus of any one of examples 21 through 25, further including means for providing the instrumented GPU kernel to a GPU for execution.

Example 27 includes the apparatus of example 26, further including means for collecting operational statistics resulting from the execution of the instrumented GPU kernel by the GPU.

Example 28 includes the apparatus of example 21, wherein the means for creating is further to insert profiling cleanup instructions into the instrumented GPU kernel.

Example 29 includes the apparatus of example 21, further including means for retrieving the first entry point address and the second entry point address of the original GPU kernel from a GPU.

Example 30 includes the apparatus of example 21, wherein the means for creating is to insert at least one no-operation instruction in the instrumented GPU kernel between the first entry point address and the second entry point address.

Example 31 includes a method of inserting profiling instructions into graphics processing unit (GPU) kernels, the method comprising detecting a first entry point address and a second entry point address of the original GPU kernel, adding instructions of the original GPU kernel and one or more profiling instructions to an instrumented GPU kernel using an instruction address offset, inserting, at the first entry point address of the instrumented GPU kernel, a first jump instruction to jump to first profiling initialization instructions, inserting, at the second entry point address of the instrumented GPU kernel, a second jump instruction to jump to second profiling initialization instructions, and inserting profiling measurement instructions into the instrumented GPU kernel.

Example 32 includes the method of example 31, wherein the first profiling initialization instructions including a second jump instruction to jump to a modified first entry point address, the modified first entry point address based on the first entry point address and an instruction address offset.

Example 33 includes the method of example 32, wherein the second profiling initialization instructions including a fourth jump instruction to jump to a modified second entry point address, the modified second entry point address based on the second entry point address and the instruction address offset.

Example 34 includes the method of example 31, further including determining a size of the original GPU kernel, wherein the instructions of the original GPU kernel are added to the instrumented GPU kernel using an instruction address offset based on a size of the original GPU kernel.

Example 35 includes the method of example 31, wherein the instructions of the original GPU kernel are added to the instrumented GPU kernel using an instruction address offset based on an entry point address of the original GPU kernel.

Example 36 includes the method of any one of examples 31 through 35, further including providing the instrumented GPU kernel to a GPU for execution.

Example 37 includes the method of example 36, further including collecting operational statistics resulting from the execution of the instrumented GPU kernel by the GPU.

Example 38 includes the method of example 31, further including inserting profiling cleanup instructions into the instrumented GPU kernel.

Example 39 includes the method of example 31, further including retrieving the first entry point address and the second entry point address of the original GPU kernel from a GPU.

Example 40 includes the method of example 31, further including inserting at least one no-operation instruction in the instrumented GPU kernel between the first entry point address and the second entry point address.

Example 41 includes an apparatus to create instrumented graphics processing unit (GPU) kernels, the apparatus comprising an entry point detector to detect a first entry point address and a second entry point address of an original GPU kernel, the first entry point address including a first entry point instruction, the second entry point address including a second entry point instruction, an instruction inserter to create a corresponding instrumented GPU kernel from the original GPU kernel by inserting first profiling initialization instructions at a first address of the instrumented GPU kernel, the first address different from the first entry point address, the first profiling initialization instructions including a first jump instruction directed to the first entry point instruction, the instruction inserter to insert second profiling initialization instructions at a second address of the instrumented GPU kernel, the second address different from the second entry point address, the second profiling initialization instructions including a second jump instruction directed to the second entry point instruction, the instruction inserter to insert profiling measurement instructions into the instrumented GPU kernel, and an entry point adjuster to adjust a list of entry points of the instrumented GPU kernel to replace the first entry point address with the first address and the second entry point address with the second address.

Example 42 includes the apparatus of example 41, further including an instruction provider to provide the instrumented GPU kernel to a GPU for execution.

Example 43 includes the apparatus of example 42, further including a statistic collector to collect operational statistics resulting from the execution of the instrumented GPU kernel by the GPU.

Example 44 includes the apparatus of example 41, wherein the instruction inserter is further to insert profiling cleanup instructions into the instrumented GPU kernel.

Example 45 includes the apparatus of example 41, wherein the entry point detector is to retrieve the list of entry points of the original GPU kernel from a GPU.

Example 46 includes at least one non-transitory computer readable medium comprising instructions that, when executed, cause at least one processor to at least detect a first entry point address and a second entry point address of an original GPU kernel, the first entry point address including a first entry point instruction, the second entry point address including a second entry point instruction, insert first profiling initialization instructions at a first address of an instrumented GPU kernel, the first address different from the first entry point address, the first profiling initialization instructions including a first jump instruction directed to the first entry point instruction, insert second profiling initialization instructions at a second address of the instrumented GPU kernel, the second address different from the second entry point address, the second profiling initialization instructions including a second jump instruction directed to the second entry point instruction, modify a list of entry points of the instrumented GPU kernel to replace the first entry point address with the first address and the second entry point address with the second address, and insert profiling measurement instructions into the instrumented GPU kernel.

Example 47 includes the at least one non-transitory computer readable medium of example 46, wherein the instructions, when executed, cause the at least one processor to at least provide the instrumented GPU kernel to a GPU for execution.

Example 48 includes the at least one non-transitory computer readable medium of example 47, wherein the instructions, when executed, cause the at least one processor to at least collect operational statistics resulting from the execution of the instrumented GPU kernel by the GPU.

Example 49 includes the at least one non-transitory computer readable medium of example 46, wherein the instructions, when executed, cause the at least one processor to at least insert profiling cleanup instructions into the instrumented GPU kernel.

Example 50 includes the at least one non-transitory computer readable medium of example 46, wherein the instructions, when executed, cause the at least one processor to at least retrieve the list of entry points of the original GPU kernel from a GPU.

Example 51 includes an apparatus to insert profiling instructions into graphics processing unit (GPU) kernels, the apparatus comprising means for detecting a first entry point address and a second entry point address of an original GPU kernel, the first entry point address including a first entry point instruction, the second entry point address including a second entry point instruction, means for creating a corresponding instrumented GPU kernel by inserting first profiling initialization instructions at a first address of the instrumented GPU kernel, the first address different from the first entry point address, the first profiling initialization instructions including a first jump instruction directed to the first entry point instruction, the means for creating to insert second profiling initialization instructions at a second address of the instrumented GPU kernel, the second address different from the second entry point address, the second profiling initialization instructions including a second jump instruction directed to the second entry point instruction, the means for creating to insert profiling measurement instructions into the instrumented GPU kernel, and means for adjusting a list of entry points of the instrumented GPU kernel to replace the first entry point address with the first address and the second entry point address with the second address.

Example 52 includes the apparatus of example 51, further including means for providing the instrumented GPU kernel to a GPU for execution.

Example 53 includes the apparatus of example 52, further including means for collecting operational statistics resulting from the execution of the instrumented GPU kernel by the GPU.

Example 54 includes the apparatus of example 51, wherein the means for creating is further to insert profiling cleanup instructions into the instrumented GPU kernel.

Example 55 includes the apparatus of example 51, wherein the means for detecting is further to retrieve the list of entry points of the original GPU kernel from a GPU.

Example 56 includes a method of inserting profiling instructions into graphics processing unit (GPU) kernels, the method comprising detecting a first entry point address and a second entry point address of an original GPU kernel, the first entry point address including a first entry point instruction, the second entry point address including a second entry point instruction, inserting first profiling initialization instructions at a first address of an instrumented GPU kernel, the first address different from the first entry point address, the first profiling initialization instructions including a first jump instruction directed to the first entry point instruction, inserting second profiling initialization instructions at a second address of the instrumented GPU kernel, the second address different from the second entry point address, the second profiling initialization instructions including a second jump instruction directed to the second entry point instruction, modifying a list of entry points of the instrumented GPU kernel to replace the first entry point address with the first address and the second entry point address with the second address, and inserting profiling measurement instructions into the instrumented GPU kernel.

Example 57 includes the method of example 56, further including providing the instrumented GPU kernel to a GPU for execution.

Example 58 includes the method of example 57, further including collecting operational statistics resulting from the execution of the instrumented GPU kernel by the GPU.

Example 59 includes the method of example 56, further including inserting profiling cleanup instructions into the instrumented GPU kernel.

Example 60 includes the method of example 56, further including retrieving the list of entry points of the original GPU kernel from a GPU.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to create instrumented graphics processing unit (GPU) kernels, the method comprising:
   determining whether a GPU supports modification of entry point addresses;
   detecting a first entry point address and a second entry point address of an original GPU kernel;
   creating a corresponding instrumented GPU kernel from the original GPU kernel based on the determination by:
   inserting, by executing instructions with a processor, at least one of first profiling initialization instructions or first jump instructions at the first entry point address of the instrumented GPU kernel;
   inserting at least one of second profiling initialization instructions or second jump instructions at the second entry point address of the instrumented GPU kernel; and
   inserting profiling measurement instructions into the instrumented GPU kernel.

2. The method of claim 1, wherein the GPU does not support modification of the entry point addresses, and the method further includes:
   inserting the first jump instructions to jump to the first profiling initialization instructions, the first profiling initialization instructions at a first address of the instrumented GPU kernel; and
   inserting the second jump instructions to jump to the second profiling initialization instructions, the second profiling initialization instructions at a second address of the instrumented GPU kernel.

3. The method of claim 2, wherein:
   the first profiling initialization instructions include a third jump instruction to jump to a modified first entry point address, the modified first entry point address based on the first entry point address and an instruction address offset; and
   the second profiling initialization instructions include a fourth jump instruction to jump to a modified second entry point address, the modified second entry point address based on the second entry point address and the instruction address offset.

4. The method of claim 3, further including determining a size of the original GPU kernel, wherein instructions of the original GPU kernel are added to the instrumented GPU kernel using the instruction address offset based on the size of the original GPU kernel.

5. The method of claim 1, wherein the GPU does not support modification of the entry point addresses, and the method further includes:
   inserting first profiling initialization instructions at a first address of the instrumented GPU kernel, the first address different from the first entry point address, the first profiling initialization instructions including the first jump instructions directed to a first entry point instruction; and
   inserting second profiling initialization instructions at a second address of the instrumented GPU kernel, the second address different from the second entry point address, the second profiling initialization instructions including the second jump instructions directed to a second entry point instruction.

6. The method of claim 5, further including adjusting a list of entry points of the instrumented GPU kernel to replace the first entry point address with the first address and the second entry point address with the second address.

7. The method of claim 1, further including:
   providing the instrumented GPU kernel to the GPU for execution; and collecting operational statistics resulting from the execution of the instrumented GPU kernel by the GPU.

8. The method of claim 1, further including determining whether the GPU supports modification of the entry point addresses based on modifying an entry point address of a dummy kernel.

9. A method for inserting profiling instructions into graphics processing unit (GPU) kernels, the method comprising:
   detecting a first entry point address and a second entry point address of an original GPU kernel;
   determining a size of the original GPU kernel;
   adding, by executing instructions with a processor, instructions of the original GPU kernel and one or more profiling instructions to an instrumented GPU kernel using an instruction address offset, wherein the instruction address offset is based on the size of the original GPU kernel;
   inserting at the first entry point address of the instrumented GPU kernel, a first jump instruction to jump to first profiling initialization instructions;
   inserting at the second entry point address of the instrumented GPU kernel, a second jump instruction to jump to second profiling initialization instructions; and
   inserting profiling measurement instructions of the profiling instructions into the instrumented GPU kernel.

10. The method of claim 9, further including inserting a third jump instruction in the first profiling initialization instructions, the third jump instruction to jump to a modified first entry point address, the modified first entry point address based on the first entry point address and an instruction address offset.

11. The method of claim 10, further including inserting a fourth jump instruction in the second profiling initialization instructions, the fourth jump instruction to jump to a modified second entry point address, the modified second entry point address based on the second entry point address and the instruction address offset.

12. The method of claim 9, further including adding the instructions of the original GPU kernel to the instrumented GPU kernel using an instruction address offset based on an entry point address of the original GPU kernel.

13. The method of claim 9, further including providing the instrumented GPU kernel to a GPU for execution.

14. The method of claim 13, wherein the instructions, further including collecting operational statistics resulting from the execution of the instrumented GPU kernel by the GPU.

15. The method of claim 9, further including insert profiling cleanup instructions into the instrumented GPU kernel.

16. The method of claim 9, further including inserting at least one no-operation instruction in the instrumented GPU kernel between the first entry point address and the second entry point address.

17. An apparatus to insert characterization instructions into graphics processing unit (GPU) kernels, the apparatus comprising:
   means for identifying a first entry point address and a second entry point address of an original GPU kernel;
   means for inserting to create a corresponding instrumented GPU kernel from the original GPU kernel by adding instructions of the original GPU kernel and a plurality of characterization instructions to the instrumented GPU kernel, the means for inserting to insert, at the first entry point address of the instrumented GPU kernel, a first jump instruction to jump to first initialization instructions for characterization, the means for inserting to insert, at the second entry point address of the instrumented GPU kernel, a second jump instruction to jump to second initialization instructions for characterization, the means for inserting to insert measurement instructions from the characterization instructions into the instrumented GPU kernel; and
   means for determining a size of the original GPU kernel, wherein instructions of the original GPU kernel are added to the instrumented GPU kernel using an instruction address offset based on the size of the original GPU kernel.

18. The apparatus of claim 17, further including means for providing the instrumented GPU kernel to a GPU for execution.

19. The apparatus of claim 18, further including means for collecting operational statistics resulting from the execution of the instrumented GPU kernel by the GPU.

20. The apparatus of claim 17, wherein the means for inserting is further to insert profiling cleanup instructions into the instrumented GPU kernel.

* * * * *